(12) United States Patent
Cho

(10) Patent No.: US 8,313,205 B2
(45) Date of Patent: Nov. 20, 2012

(54) LIGHTING DEVICE FOR DISPLAY DEVICE, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 413 days.

(21) Appl. No.: 12/601,721

(22) PCT Filed: Mar. 7, 2008

(86) PCT No.: PCT/JP2008/054148
§ 371 (c)(1),
(2), (4) Date: Nov. 24, 2009

(87) PCT Pub. No.: WO2008/155933
PCT Pub. Date: Dec. 24, 2008

(65) Prior Publication Data
US 2010/0135005 A1    Jun. 3, 2010

(30) Foreign Application Priority Data
Jun. 18, 2007  (JP) ................................ 2007-159991

(51) Int. Cl.
*F21V 8/00* (2006.01)

(52) U.S. Cl. ...................................... 362/97.2; 362/561
(58) Field of Classification Search ................. 362/97.2, 362/561, 97.1, 609, 614; 349/67, 70
See application file for complete search history.

(56) References Cited

U.S. PATENT DOCUMENTS

| 6,793,361 | B2 | 9/2004 | Matsui |
| 2002/0030993 | A1 | 3/2002 | Itoh |
| 2003/0058635 | A1* | 3/2003 | Matsui ........................... 362/97 |

FOREIGN PATENT DOCUMENTS

| CN | 1428640 A | 6/2002 |
| JP | 5-150235 | 6/1993 |
| JP | 2002-082624 | 3/2002 |
| JP | 2002-372933 | 12/2002 |
| JP | 2004-265709 | 9/2004 |
| JP | 2006-054126 | 2/2006 |

OTHER PUBLICATIONS

International Search Report for PCT/JP2008/054148, mailed May 27, 2008.

* cited by examiner

*Primary Examiner* — Sharon Payne
(74) *Attorney, Agent, or Firm* — Nixon & Vanderhye P.C.

(57) ABSTRACT

An optical member 16 capable of light transmission and having a sheet-shape is installed in a chassis 13 of a backlight device 10 around an opening of the chassis 13. A cold cathode tube 15 capable of emitting light and having a substantially circle cross-section is installed behind the optical member 16 inside the chassis 13. A reflecting sheet 14 that reflects light emitted from the cold cathode tube 15 is installed behind the cold cathode tube 15 inside the chassis 13. The reflecting sheet 14 has a concave portion that surrounds the cold cathode tube 15 from the rear. The reflecting sheet 14 has an arch surface 26 at least in an area that faces the cold cathode tube 15 in a direction perpendicular to the surface of the optical member 16. The arch surface 26 is formed in a concentric manner as the cold cathode tube 15.

11 Claims, 8 Drawing Sheets

LIGHTING DEVICE FOR DISPLAY DEVICE, DISPLAY DEVICE AND TELEVISION RECEIVER

This application is the U.S. national phase of International Application No. PCT/JP2008/054148 filed 7 Mar. 2008, which designated the U.S. and claims priority to JP Application No. 2007-159991 filed 18 Jun. 2007, the entire contents of each of which are hereby incorporated by reference.

TECHNICAL FIELD

The technology presented herein relates to a lighting device for a display device, a display device and a television receiver.

BACKGROUND AND SUMMARY

A liquid crystal display device includes a liquid crystal panel and a backlight device installed in the rear of the display panel. The backlight device includes a chassis having an opening on the liquid crystal panel side, a plurality of cold cathode tubes installed in the chassis, a reflecting sheet installed behind the reflecting sheet in the chassis, and an optical member fitted in an opening of the chassis and arranged in front of the cold cathode tubes.

Light emitted from each cold cathode tube reaches the optical member directly or after reflected by the reflecting sheet, and then travels toward the liquid crystal panel after converted into substantially flat light by the optical member.

The direction of the light reflected by the reflecting sheet can be controlled by defining the shape of the reflecting sheet, and an example of which is shown in Patent Document 1. In this example, the reflecting sheet has concave portions with a parabolic-shape cross-section. It is arranged such that concave portions surround respective cold cathode tubes. Thus, light reflected in the concave portions of the reflecting sheet travels at an angle perpendicular to the surface of the optical member. Therefore, the liquid crystal panel is illuminated with strong light.
Patent Document 1: JP-A-2004-265709

The above described art, however, still have room for improvement. After beams of light emitted from the cold cathode tubes to the rear are reflected off the concave portion of the reflecting sheet, they travel back to the tube at an angle perpendicular to the surface of the optical member. Beams of the reflected light are refracted when passing through glass tubes of the cold cathode tubes, and are most likely to travel in random directions. Therefore, light use efficiency of the above described art is not favorable.

The present technology was made in view of the foregoing circumstances, and a feature thereof is to improve light use efficiency.

The example embodiment presented herein includes a sheet-shaped optical member, a tubular light source with a substantially circular cross-section, and a reflecting member. The optical member is capable of light transmission. The tubular light source is capable of emitting light and arranged behind the optical member. The reflecting member reflects light emitted from the light source toward the optical member. The reflecting member has a concave portion for surround the tubular light source from the rear. The concave portion has an arch surface at least in an area that faces the tubular light source in a direction perpendicular to the surface of the optical member. The arch surface is formed in a concentric manner as the tubular light source.

According to this construction, a beam of light emitted from the tubular light source and reflected off the arch surface of the concave portion of the reflecting member travel in a normal direction to a surface of the tubular light source having a substantially circular cross-section. The beam of the reflected light passes the center of the tubular light source and continues toward the optical member. As a result, the beam of light emitted from the tubular light source to the rear is less likely to be refracted after passing through the surface of the tubular light source.

DETAILED DESCRIPTION

Embodiment 1

An embodiment 1 will be explained with reference to FIGS. 1 to 4. In embodiment 1, a liquid crystal display device D is used as an example of a display device.

Figure 1:
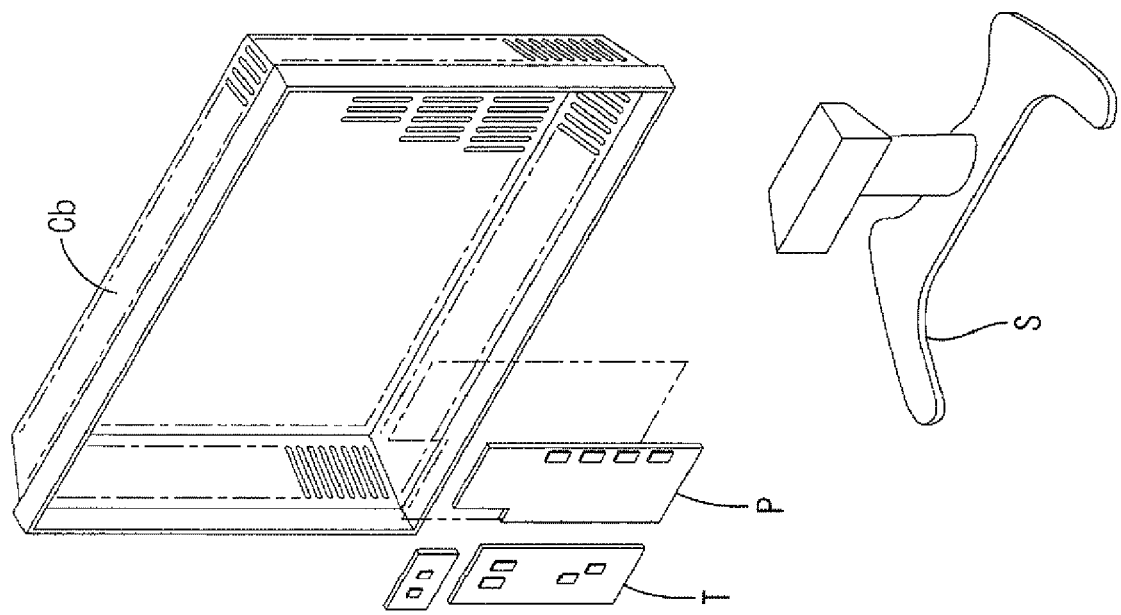
FIG. 1 is an exploded view showing the general construction of a television receiver according to an embodiment 1.
Figure 1:
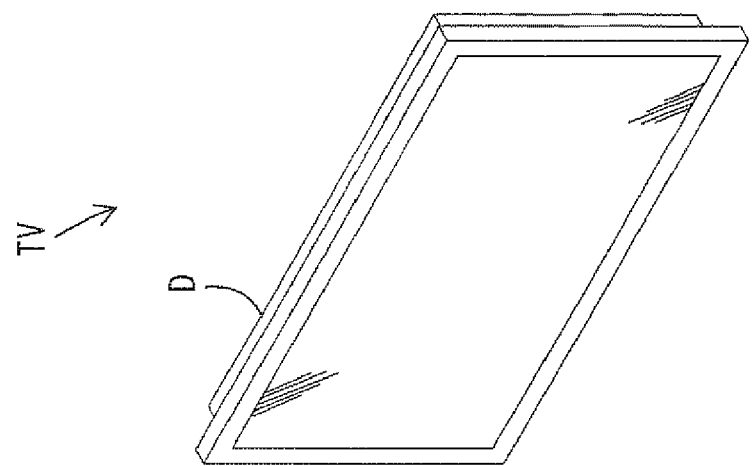
Figure 1:
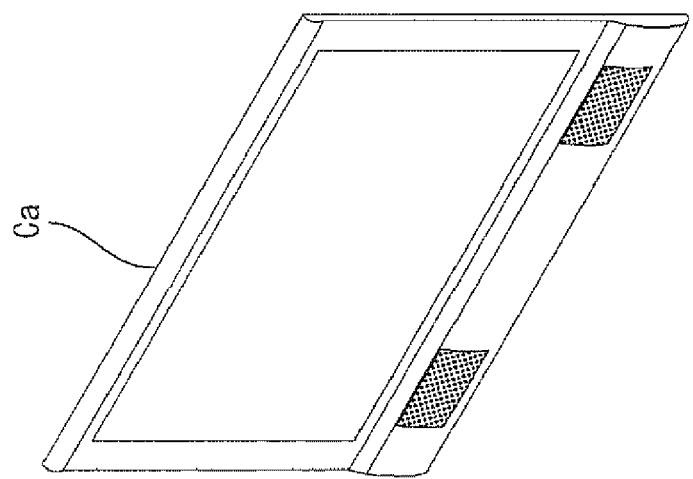
Figure 2:
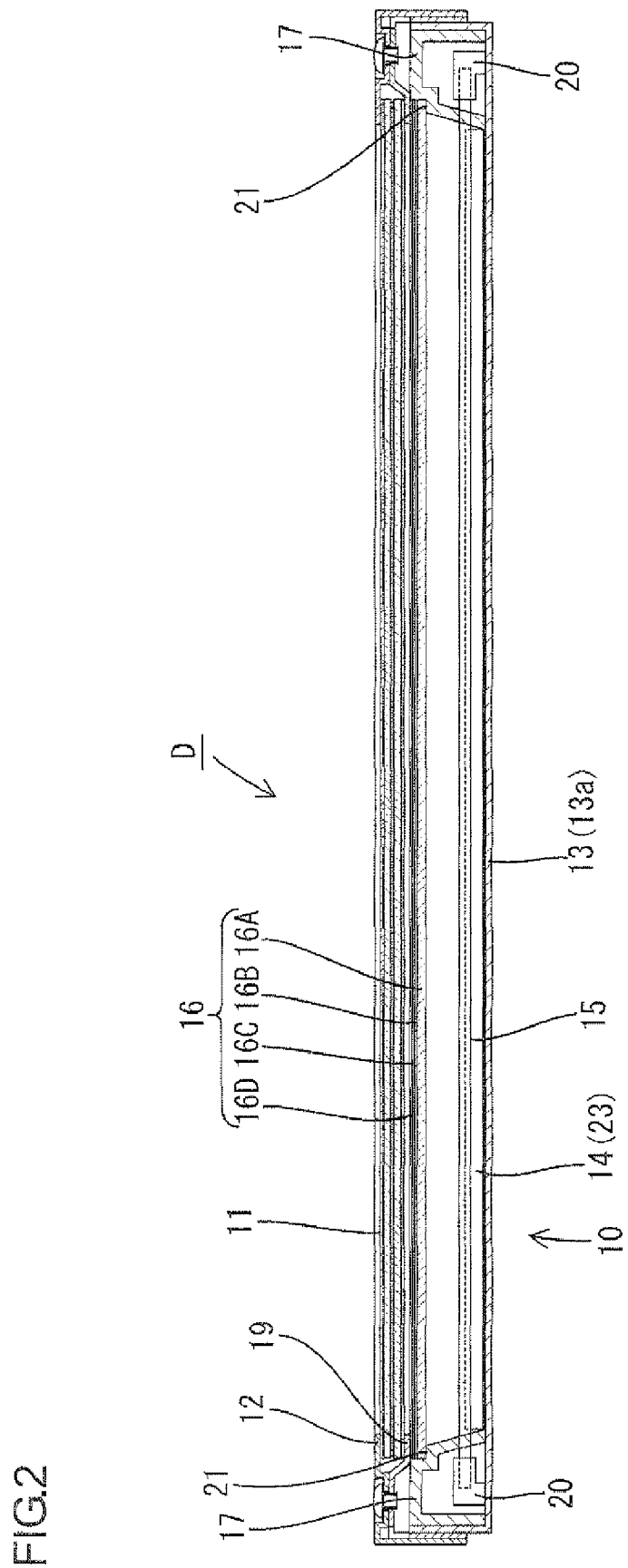
FIG. 2 is a cross-sectional view of the liquid crystal display device cut in a long side direction of the chassis.

An overall shape of the liquid crystal display device D is a rectangular shape in a landscape orientation. As shown in FIG. 2, it includes a backlight device 10 arranged behind a liquid crystal panel 11 (i.e., below the panel 11 in FIGS. 2 and 3, closer to the back of the liquid crystal panel 11). The liquid crystal panel 11 is capable of displaying an image. The backlight device is an external light source (lighting device) capable of emitting light toward the liquid crystal panel 11. The backlight device 10 and the liquid crystal panel 11 are both integrally held by a bezel 12 that is fitted on the front side of the liquid crystal panel 11. The liquid crystal display device D can be applied to a television receiver. The television receiver TV, as shown in FIG. 1, includes the liquid crystal display device D, front and rear cabinets Ca and Cb for holding the liquid crystal display device D inbetween, a power source P, a tuner T and a stand S.

The liquid crystal panel 11, as shown in FIG. 2, has a known structure, in which liquid crystal is enclosed between transparent TFT and CF boards. The liquid crystal changes its optical characteristics as an application of voltage. The TFT board has a TFT (Thin Film Transistor) as a switching component. The TFT is connected with source wiring and gate wiring that are bisected at right angles. The CF board has color filters of red (R), green (G) and blue (B) arranged in matrix. Polarizing plates are attached to the surfaces of both boards opposite to the liquid crystal, respectively.

Figure 3:
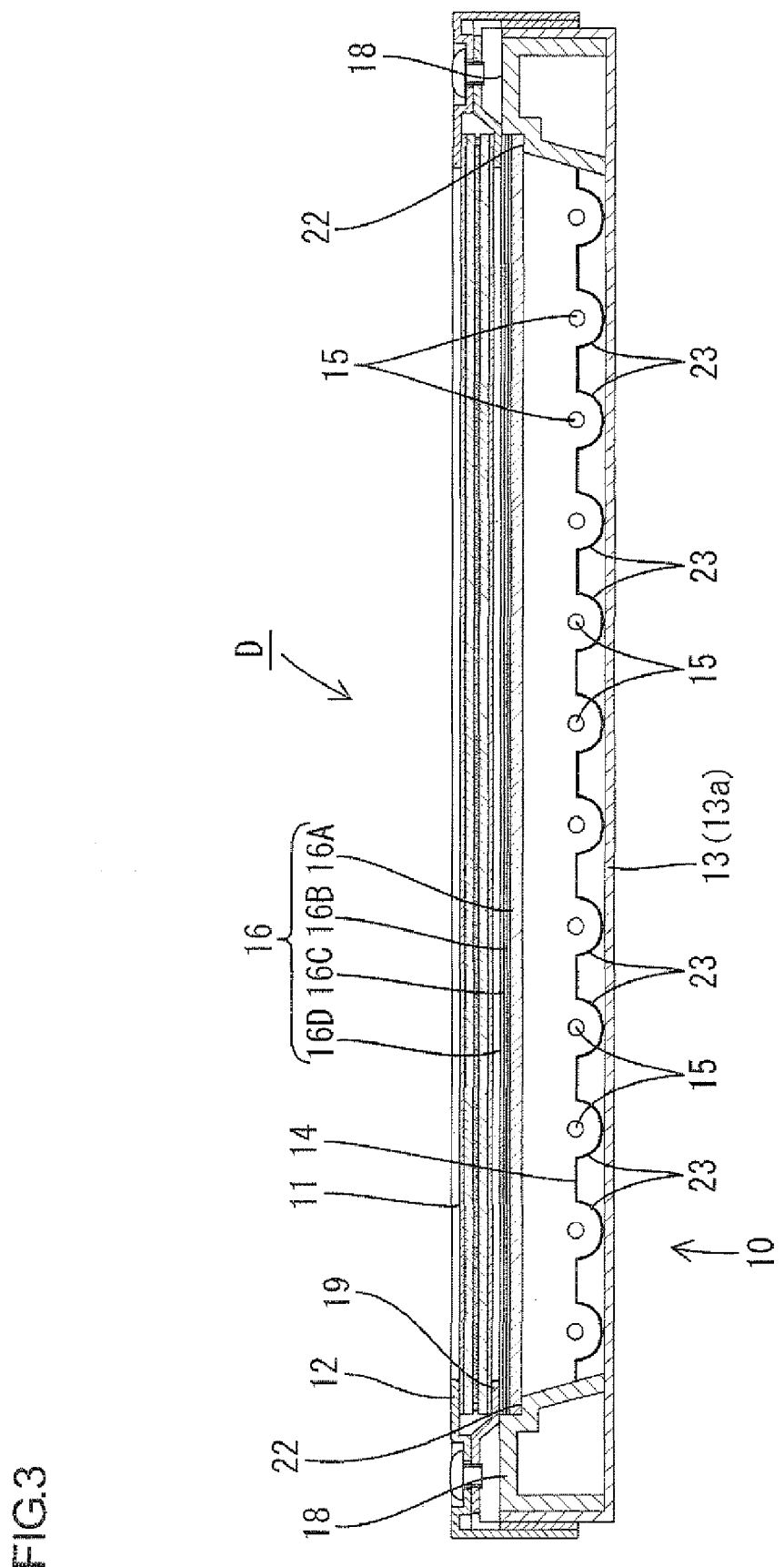
FIG. 3 is a cross-sectional view of the liquid crystal display device cut in a short side direction of the chassis.

The backlight device 10, as shown in FIGS. 2 and 3, includes a chassis 13, a reflecting sheet 14, a plurality of cold cathode tubes 15 (tubular light sources), an optical member 16, and positioning members for positioning the optical member 16 (lamp holder 17, holder 18 and frame 19 described later). The chassis 13 has an opening on its front side that is a light emitting side (i.e., the upper side in FIGS. 2 and 3, liquid crystal panel 11 side, front side). The reflecting sheet 14 is laid inside the chassis 13. The optical member 16 is arranged between the plurality of cold cathode tubes 15 and the liquid crystal panel 11. The backlight device 10 is a direct-light type backlight that uses a plurality of cold cathode tubes 15 arranged in parallel behind the liquid crystal panel 11.

The chassis 13 is made of metal and formed in a shallow substantially box-shape with a rectangular plan view and an opening on the front side. The cold cathode tubes 15 are linear light sources. Each of them has a long glass tube 15a having a substantially circular cross-section, in which mercury or the like is enclosed, and fluorescent material is applied to their inner surfaces. Electrodes are also enclosed at both ends. When the cold cathode tube 15 is lit, light is radially emitted around a center C its axis. Rubber holders 20 are fitted to non-light-emitting portions of the cold cathode tube 15 at both ends for mounting the cold cathode tube 15 to the chassis 13. The cold cathode tubes 15 are mounted inside the chassis 13 such that their axes are parallel to the long side of the chassis 13, and arranged in certain intervals. The cold cathode tubes 15 are arranged in equal intervals facing the back surface of the optical member 16.

Similarly to the chassis 13 and the liquid crystal panel 11, the optical member 16 has a rectangular plan view. It is made of synthetic resin with transparency. It is attached around the opening of the chassis 13 between the cold cathode tubes 15 and the liquid crystal panel 11. The optical member 16 includes a diffuser plate 16A, a diffusing sheet 16B, a lens sheet 16C and a brightness enhancement sheet 16D, which are overlaid in the above order from the backside (i.e., the cold cathode tube 15 side, rear side). It is capable of converting light emitted from each cold cathode tube 15, which is a linear light source, to flat light. The diffuser plate 16A located in the rearmost is thicker than other sheets 16B to 16D, and has relatively high rigidity. A mass diffusing particles is decentrally inserted in a transparent substrate having a certain thickness. This makes the diffuser plate 16A generally semi-transparent.

The positioning member includes lamp holders 17, holders 18 and a frame 19. The lamp holders 17 and the holders 18 are assembled to form a frame-shape reception member that receives outer ends of the optical member 16 from the rear. The frame 19 is a holddown member that holds down the outer ends of the optical member 16 from the front.

The lamp holders 17 are made of synthetic resin in white or pale color having surfaces with high reflectivity. The lamp holders 17 are attached to the respective ends on the longitudinal side of the chassis 13 as in a pair such that each of which extends along the short side of the chassis 13. The lamp holders 17 have a substantially box-shape with an opening on its rear. They cover the resin holders 20 attached to the cold cathode tubes 15 entirely from the front. Step-like reception sections 21 are formed in the inner ends of the front surface of the lamp holders 17 for receiving the optical member 16.

The holders 18 are made of synthetic resin in white or pale color having surfaces with high reflectivity. The holders 18 are attached to the respective ends on the short side of the chassis 13 such that each of which extends along the longitudinal side of the chassis 13. Step-like reception sections 22 are formed in the inner ends of the front surface of the holders 18 for receiving the optical member 16, similar to the lamp holders 17.

The frame 19 is made of metal and formed in a frame-shape. It holds down almost entire outer ends of the optical member 16 from the front. The frame 19 has a holddown surface that faces a plate surface of the optical member 16 on its inner ends. The holddown surface is arranged with a small clearance from the front plate surface of the brightness enhancement sheet 16D, which is located at the frontmost, when assembled. This provides a room for the optical member 16 when it expands or contracts by heat.

Next, the reflecting sheet 14 will be described in detail. The reflecting sheet 14 is a thin sheet made of synthetic resin having a surface in white or pale color with high reflectivity. As shown in FIGS. 2 and 3, the reflecting sheet 14 is lied inside the chassis 13 covering almost entire area of a bottom plate 13a of the chassis 13. It has a rectangular plan view similar to the bottom plate 13a. The reflecting sheet 14 reflects light emitted from each cold cathode tube 15 toward the rear to the opening of the chassis 13, that is, to the optical member 16 and the liquid crystal panel 11.

Predefined areas of the reflecting sheet 14 around each cold cathode tube 15 are concaved (i.e., projected to its rear) to form concave portions 23 for surrounding the respective cold cathode tubes 15 from the rear. Each concave portion 23 is formed in a tub-like shape (groove) along the longitudinal side of the chassis 13 or the optical member 16, that is, an axis (i.e., longitudinal direction) of the cold cathode tube 15. In other words, the concave portion 23 has a shape like a tube that extends in an axial direction (i.e., longitudinal direction) of the cold cathode tube 15 sliced in half.

Figure 4:
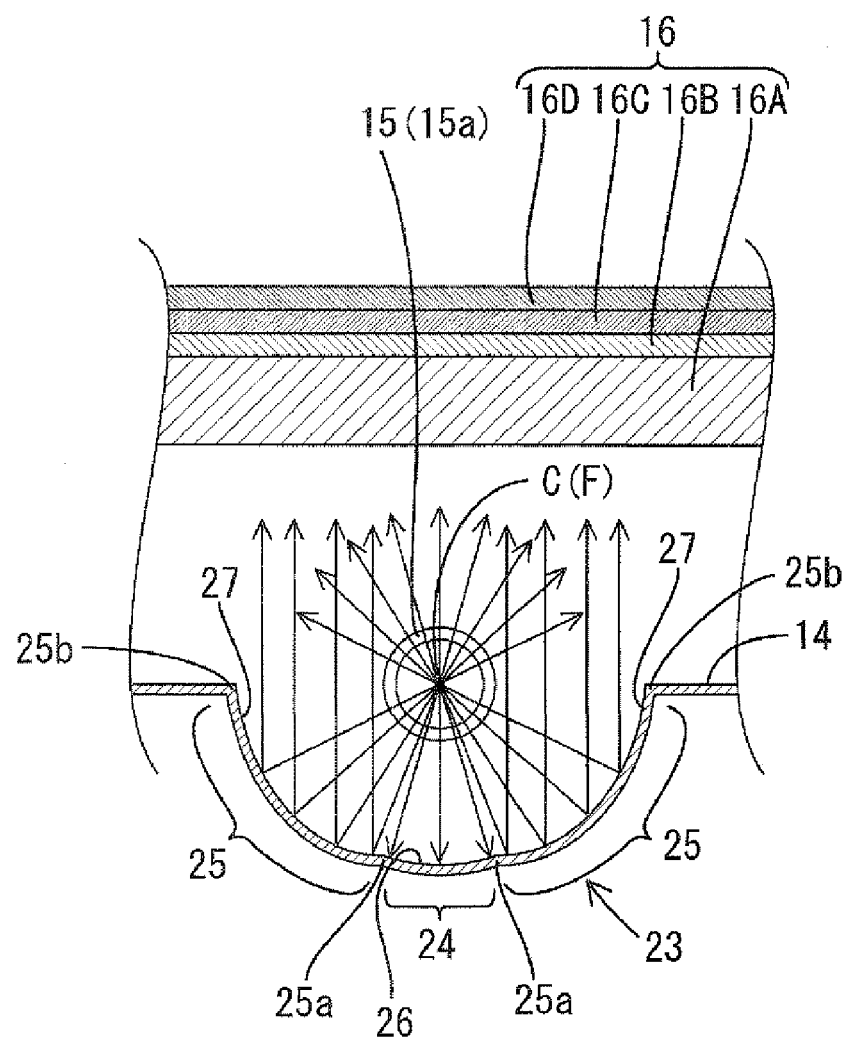
FIG. 4 is an enlarged cross-sectional view of a concave portion.

Next, a cross-sectional view of the concave portion 23 cut in the direction perpendicular to its extending direction (i.e., longitudinal direction) will be explained in detail. As shown in FIG. 4, widths of the opening of the concave portion 23 become larger toward the cold cathode tube 15 side. The inner surface of the concave portion 23 is curved with different curvature. An arch section 24 having an arch-like cross-section is formed in an area of the concave portion 23 that faces the rear of the cold cathode tube 15. Parabolic sections 25 having parabolic arch-like cross-section are formed in a pair in areas adjacent to the arch section 24 and continued from ends of the arch section 24. The concave portion 23 is formed symmetrically around the symmetrical axis that lies in the vertical direction of FIG. 4 (i.e., perpendicular to the surface of the optical member 16) and crosses the center of the cold cathode tube 15.

More precisely, in the concave portion 23, the arch sections 24 are formed in areas that face the cold cathode tube 15 in a vertical direction of FIG. 4, that is, in a direction perpendicular to the surface of the optical member 16. The center of the arch section 24 is identical to the center C of the cold cathode tube 15, that is, the arch section 24 is formed in a concentric manner as the cold cathode tube 15. The entire inner surface of the arch section 24 is formed as the arch surface 26. When light radially emitted from the cold cathode tube 15 reflects off the arch surface 26, the reflected light travels in the same direction as a normal line of the outer peripheral surface of the glass tube 15a of the cold cathode tube 15. In other words, the reflected light travels toward the center C of the cold cathode tube 15, which is also the center of the arch surface 26.

Horizontal sizes (width) of the arch sections 24 and the arch surface 26 (i.e., sizes measured in the direction perpendicular to the length direction of the concave portion 23 and cold cathode tube 15) are about the same as the outside diameter of the cold cathode tube 15. In other words, when the reflecting sheet is viewed from the front side, the entire rear area covered by the cold cathode tube 15 is the arch section 24 and the arch surface 26. The arch section 24 has a constant curvature.

The parabolic sections 25 are formed in areas on the sides of the cold cathode tube 15, that is, areas off the cold cathode tube 15 in the horizontal direction of FIG. 4. The parabolic sections 25 are formed in parabolic shapes around the focus F that is aligned in the same position as the center C of the cold cathode tube 15. Their inner surfaces are formed as parabolic surfaces 27. When light radially emitted from the cold cathode tube 15 reflects off the parabolic surface 27, the travel direction of the reflected light is identical to the vertical direction of FIG. 4, that is, the direction perpendicular to the surface of the optical member 16. The reflected light off the parabolic surface 27 travels in parallel with each other and perpendicular to the surface of the optical member 16.

An inner end 25a of the parabolic section 25 (parabolic surface 27) that is connected to the arch section 24 is located at the lowest position (i.e., the farthest from the optical member 16) while the outer end 25b at the other end is located at the highest position (the nearest from the optical member 16). The outer end 25b that is located at the highest position is a front end of the concave portion 23 and located at almost the same height as the center C of the cold cathode tube 15. Therefore, light radially emitted from the cold cathode tube 15 to the rear is reflected up toward the optical member 16 by the concave portion 23.

Shown above is the structure of the present embodiment, and operation of the present embodiment will be explained next. To display an image on the liquid crystal display device D, each cold cathode tube 15 should be turned on and a signal according to the image should be sent to each line of the liquid crystal panel 11 from an external circuit. Next, a travel path of light emitted from each cold cathode tube 15 until reached the optical member 16 will be explained in detail.

When the cold cathode tube 15 is turned on, light is emitted radially from its center C as shown in FIG. 4. Light emitted from the front half of the cold cathode tube 15 (i.e., from an area that is not surrounded by the concave portion 23) spreads radially and directly illuminates the diffuser plate 16A. Light emitted from the rear half (i.e., from an area that is surrounded by the concave portion 23) reflects off the reflecting sheet 14, and then travels toward the diffuser plate 16A.

More precisely, light radially emitted from the rear half of the cold cathode tube 15 reflects off the inner surface of the concave portion 23 of the reflecting sheet 14. The light emitted directly behind the cold cathode tube 15, more precisely, light emitted in an angular range defined by both ends of the arch section 24 (inner ends 25a of both parabolic sections 25) reflects off the arch surface 26. Because the arch surface 26 is formed in a concentric manner as the cold cathode tube 15, the light reflected off the surface travels in the normal direction of the circular outside surface of the glass tube 15a of the cold cathode tube 15. As a result, the reflected light off the arch surface 26 travels straight in the above-described normal direction without refraction when passing through the rear surface of the glass tube 15a. The reflected light off the arch surface 26 passes through the cold cathode tube 15 at its center C and then through the front surface of the glass tube 15a without refraction, and then travels toward the diffuser plate 16A.

The light reflected by the arch surface 26 is not refracted by the glass tube 15a of the cold cathode tube 15. It travels in the same path as the output path (i.e., a path between where light is emitted from the cold cathode tube 15 and the arch surface 26 by which it is reflected) and then to the front. Thus, the amount of light that is used for displaying an image on the liquid crystal panel 11 larger than that of when the light is refracted by the glass tube 15a and travels in random directions. This improves the brightness of the liquid crystal display device D and contributes to improvement in the display quality.

Light emitted from the rear half of the cold cathode tube 15 toward side of an area directly behind the cold cathode tube 15, that is, light emitted in an angular range defined by the inner end 25a and outer end 25b of each parabolic section 25 reflects off the parabolic surface 27 of the parabolic section 25. Because the focus F of the parabolic surface 27 is identical to the center C of the cold cathode tube 15, the reflected light off the parabolic surface 27 travels straight in the vertical direction of FIG. 4. The reflected light off the parabolic surface 27 travels in a direction perpendicular to the surface of the diffuser plate 16A.

The reflected light off the parabolic surface 27 is parallel light that travels in a direction substantially perpendicular to the surface of the optical member 16. This improves the brightness of the liquid crystal display device D and contributes to improvement in the display quality.

According to the present embodiment described above, in the concave portion 23 of the reflecting sheet 14, the arch surface 26 is formed in a concentric manner as the cold cathode tube 15 at least in an area that faces the cold cathode tube 15 in a direction perpendicular to the surface of the optical member 16. Thus, light emitted from the cold cathode tube 15 and reflected by the arch surface 26 travels in the normal direction to the surface of the cold cathode tube 15 having the substantially circular cross-section. It passes through the center C of the cold cathode tube 15 and travels toward the optical member 16. Light emitted from the cold cathode tube 15 to the rear is less likely to be refracted by the surface of the cold cathode tube 15, and therefore the light use efficiency improves.

In an area adjacent to each side of the arch surface 25 in the concave portion 23, a parabolic surface 27 is formed. Its focus F is located on a line that is perpendicular to the surface of the optical member 16 and crosses the center C of the cold cathode tube 15. Because light that has reached each side of the arch surface 26 is reflected straight up toward the optical member 16 by the parabolic surface 27, the light use efficiency further improves.

The focus F of the parabolic surface 27 is identical to the center C of the cold cathode tube 15. Thus, reflected light off the parabolic surface 27 travels in a direction substantially perpendicular to the surface of the optical member 16. This makes the light use efficiency very favorable.

The outer end 25b of each parabolic section 25, which is also a front end of the concave portion 23, is arranged at the same level as the center C of the cold cathode tube 15. Light emitted from the front half of the cold cathode tube 15 directly travels to the optical member 16. On the other hand, one emitted from the rear half is reflected and effectively directed to the optical member 16 by the concave portion 23. This makes high light use efficiency is favorable.

The concave portions 23 are formed around a symmetrical axis that is perpendicular to the surface of the optical member 16 and crosses the center C of the cold cathode tube 15. Therefore, the reflected light off the concave portion 23 evenly spreads from side to side on the optical member 16.

Modification 1

Modification 1 of the above-described embodiment 1 will be explained referring to FIG. 5. In modification 1, the parabolic sections 25 are modified in shape to parabolic sections 25'. In modification 1, a symbol "'" is added to symbols that indicate parts structurally modified from embodiment 1. Parts having the same structure, function or effect will not be discussed. The optical member 16 is not shown in drawings that will be used to explain the present modification.

Figure 5:
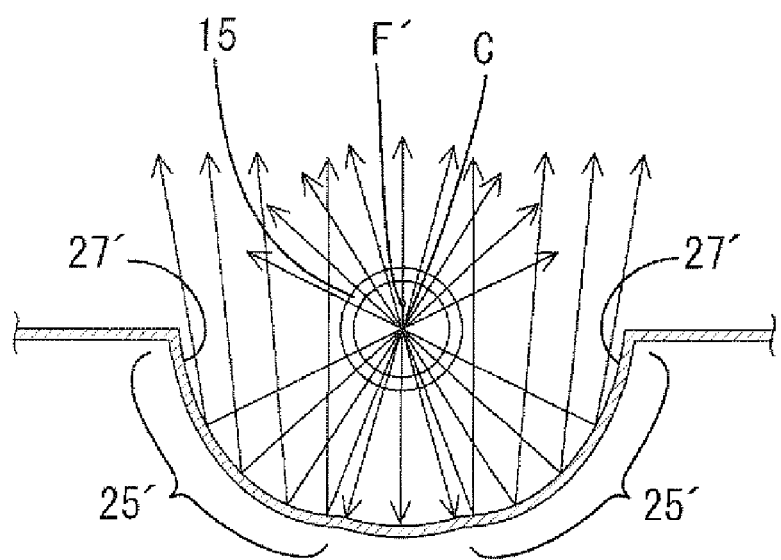
FIG. 5 is an enlarged cross-sectional view of a concave portion according to modification 1 of embodiment 1.

The parabolic sections 25' and their parabolic surfaces 27' are formed such that a focus F' is arranged above the center C of the cold cathode tube 15, as shown in FIG. 5. More precisely, the focus F' is located on a line that lies in the vertical direction of FIG. 5, that is, a line that is perpendicular to the surface of the optical member 16 and crosses the center C of the cold cathode tube 15. Furthermore, the focus F' is located closer to the optical member 16 than the center C of the cold cathode tube 15 (i.e., above the center C in FIG. 5, farther from the parabolic surface 27', which is a reflecting surface). When light emitted from the cold cathode tube 15 is reflected by the parabolic surface 27', the reflected light travels in a direction off a line that is perpendicular to the optical member and away from the cold cathode tube 15 at a predefined angle. In other words, the reflected light off the parabolic surface 27' spreads outward. As a result, the entire surface of the optical member 16 is evenly illuminated.

An angle measured between the travel direction of the reflected light and a line perpendicular to the surface of the optical member 16 varies in proportion to a distance between the focus F' and the center C of the cold cathode tube 15. Therefore, the angle is adjustable by changing a position of the focus F' (i.e., shapes of the parabolic section 25' and parabolic surface 27').

Modification 2

Modification 2 of the above-described embodiment will be explained referring to FIG. 6. In modification 2, the parabolic sections 25 are modified in shape to parabolic sections 25". In modification 2, a symbol """ is added to symbols that indicate parts structurally modified from embodiment 1. Parts having the same structure, function or effect will not be discussed.

Figure 6:
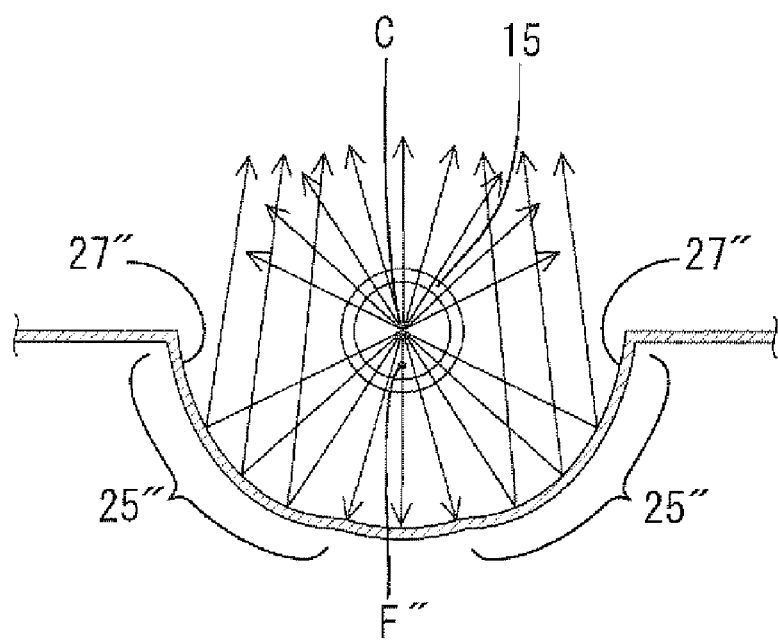
FIG. 6 is an enlarged cross-sectional view of a concave portion according to modification 2 of embodiment 1.

The parabolic sections 25" and their parabolic surfaces 27" are formed such that a focus F" is arranged below the center C of the cold cathode tube 15, as shown in FIG. 6. More precisely, the focus F" is located on a line that lies in the vertical direction of FIG. 6, that is, a line that is perpendicular to the surface of the optical member 16 an crosses the center C of the cold cathode tube 15. Furthermore, the focus F" is located farther from the optical member than the center C of the cold cathode tube 15 (i.e., below the center C in FIG. 6, closer to the parabolic surface 27", which is a reflecting surface). When light emitted from the cold cathode tube 15 is reflected by the parabolic surface 27", the reflected light travels in a direction off a line that is perpendicular to the optical member toward the cold cathode tube 15 at a predefined angle. In other words, the reflected light off the parabolic surface 27" spreads inward.

An angle measured between the travel direction of the reflected light and a line that is perpendicular to the surface of the optical member 16 varies in proportion to a distance between the focus F" and the center C of the cold cathode tube 15. Therefore, the angle is adjustable by changing a position of the focus F" (i.e., shapes of the parabolic section 25" and parabolic Surface 27").

Embodiment 2

Embodiment 2 will be explained referring to FIG. 7. In embodiment 2, the concave portion 23 is modified in form to concave portions 23A. In embodiment 2, a letter "A" is added to symbols that indicate parts having the same names as embodiment 1 but structurally modified from embodiment 1. Parts having the same structure, function or effect will not be discussed.

Figure 7:
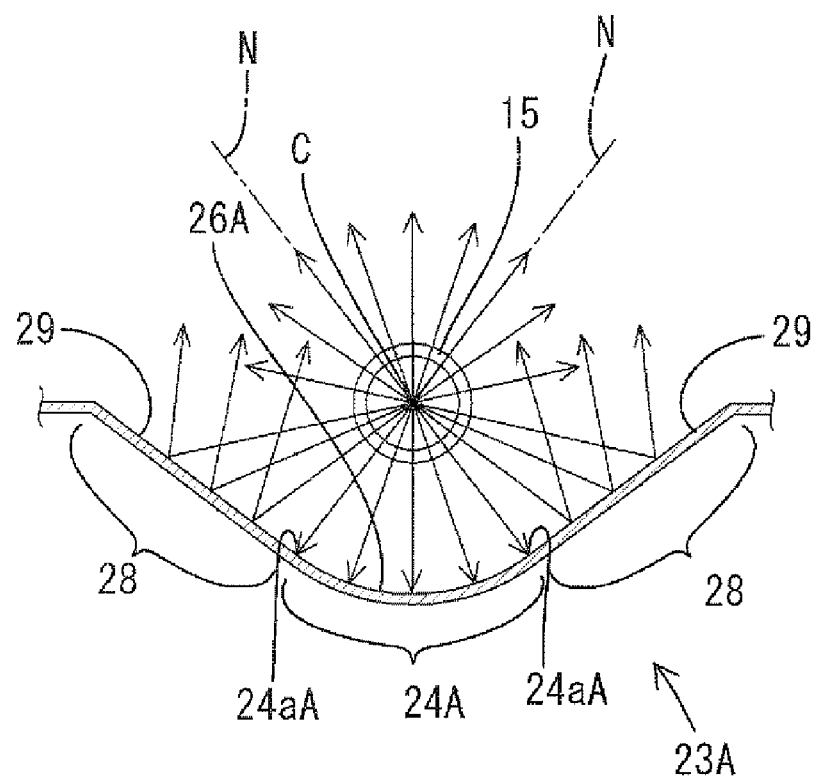
FIG. 7 is an enlarged cross-sectional view of a concave portion according to embodiment 2.

The concave portion 23A includes an arch section 24A and sloping sections 28 as shown in FIG. 7. The arch section 24A is formed such that it faces the rear of the cold cathode tube 15. The sloping sections 28 are provided in pair and arranged on respective sides of the arch section 24A such that they are connected to respective ends of the arch section 24A. The concave portion 23A is formed symmetrically around the symmetrical axis that lies in the vertical direction of FIG. 7 (i.e., perpendicular to the surface of the optical member 16) and crosses the center C of the cold cathode tube 15. A width of the arch section 24A is slightly larger than the outside diameter of the cold cathode tube 15. Front ends of the concave portion 23A that are also the outer ends of the sloping sections 28 are arranged at the same level as the center C of the cold cathode tube 15.

The sloping section 28 on each side of the arch section 24A leans away from a vertical line of FIG. 7, that is, a line perpendicular to the surface of the optical member 16, and away from the cold cathode tube 15. In other words, the sloping sections 28 lean outward forming acute angles with the surface of the optical member 16. The inner surfaces of the sloping sections 28 are sloping surfaces 29. The sloping sections 28 and sloping surfaces 29 have sloping angles such that angles measured between the sloping surfaces 29 and respective normal lines N (indicated by alternate long and short dash lines in FIG. 7) to the arch section 24A (arch surface 26A) at the ends 24aA are substantially 90 degrees. In other words, the sloping sections 28 and the sloping surfaces 29 are substantially parallel to the tangent lines of the arch section 24A at the ends 24aA.

When light radially emitted from the cold cathode tube 15 is reflected by the sloping surface 29, a beam of the reflected light travels outward with respect to a path of incident light by an angle that is a sum of incident and reflecting angles. If the entire concave portion 23A is formed as an arch section, a beam of reflected light off an arch surface travels toward the center of the cold cathode tube 15 in parallel with a beam of incident light. In comparison to that case, a beam of light that has reached the sloping surface 29 is reflected at an angle closer to a right angle with respect to the surface of the optical member 16. In other words, an angle measured between a beam of incident light and that of reflecting light is larger. Light emitted from the rear half of the cold cathode tube 15 toward each side of the arch surface 26A is reflected by the sloping surface 29 at a favorable angle to the optical member 16.

According to the present embodiment described above, the sloping surface 29 is formed in an area adjacent to each side of the arch surface 26A in the concave portion 23A. It is slanted so as to form an acute angle with the surface of the optical member 16 and such that an angle measured with respect to a normal line N of the arch section 24A (arch surface 26A) at the end 24aA is about 90 degrees. Light emitted to each side of the arch surface 26A is reflected by the sloping surface 29 at a favorable angle toward the optical member 16. Thus, the light use efficiency further improves.

Embodiment 3

Embodiment 3 will be explained referring to FIG. 8. In embodiment 3, the sloping sections 28 are modified to sloping sections 28B. In embodiment 3, a letter "B" is added to symbols that indicate parts having the same names as embodiment 1 but structurally modified from embodiment 1. Parts having the same structure, function or effect will not be discussed.

Figure 8:
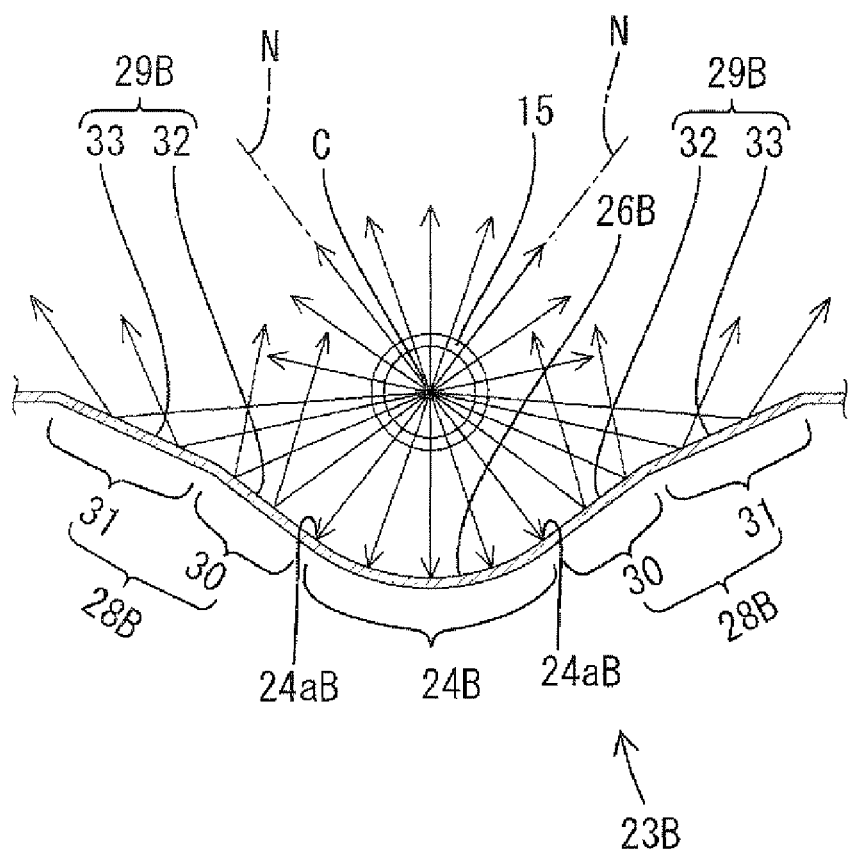
FIG. 8 is an enlarged cross-sectional view of a concave portion according to embodiment 3.

Each sloping section 28B bends at a point and its slope angle changes at that point, as shown in FIG. 8. More precisely, the sloping sections 28B have a pair of first sloping section 30 and a pair of second sloping section 31. The first sloping sections 30 are formed in areas adjacent to respective sides of arch section 24B and connected to its respective ends 24aB. The second sloping sections 31 are formed so as to be connected to respective outer ends of the first sloping sections 30. Each sloping surface 29B includes the first sloping surface 32 and the second sloping surface 3. The first sloping surface 32 is an inner surface of the first sloping section 30. The second sloping surface 33 is an inner surface of the second sloping section 31. The first sloping section 30 and the second sloping section 31 lean away from the cold cathode tube 15 with respect to a line perpendicular to the surface of the optical member 16, that is, lean outward, forming an acute angle with the surface of the optical member 16.

The first sloping sections 30 and the first sloping surfaces 32 have sloping angles such that angles measured between the sloping surfaces 32 and respective normal lines N to the arch section 24B (arch surface 26B) at the ends 24aB are substantially 90 degrees. In other words, the first sloping sections 30 and the first sloping surfaces 32 are substantially parallel to the tangent lines of the arch section 24B at the ends 24aB. The second sloping sections 31 and the second sloping surfaces 33 have sloping angles such that angles measured between the sloping surfaces 33 and respective normal lines N to the arch section 24B (arch surface 26B) at the ends 24aB are larger than 90 degrees. In other words, slopes of the second sloping sections 31 and the second sloping surfaces 33 are more gentle than the tangent line of the arch section 24B at the end 24aB or the first sloping section 30 and the firs sloping surface 32 (i.e., closer to the horizontal line).

The concave portion 23B is formed symmetrically around a symmetrical axis that lies in a direction perpendicular to the surface of the optical member 16 and crosses the center C of the cold cathode tube 15. The width of the arch section 24B is slightly larger than the outside diameter of the cold cathode tube 15. Outer ends of the second sloping sections 31, which are also the front ends of the concave portion 23B, are arranged at the same level as the center C of the cold cathode tube 15.

Light radially emitted from the cold cathode tube 15 is reflected by the sloping section 28B as follows. After the light emitted from the cold cathode tube 15 and reflected by the first sloping surface 32, a beam of the reflected light travels outward with respect to a path of incident light by an angle that is a sum of incidence and reflecting angles. If the entire concave portion 23B is formed as an arch section, a beam of reflected light off an arch surface travels toward the center of the cold cathode tube 15 in parallel with a beam of incident light. In comparison to that case, a beam of light that has reached the first sloping surface 32 is reflected at an angle closer to a right angle with respect to the surface of the optical member 16. The second sloping surface 33 has a slope gentler than the first sloping surface 32. Angles of incidence and reflection of light reflected light off the second sloping surface 33 are lager than those of light reflected off the first sloping surface 32 by a difference in angles between the first sloping surface 32 and the second sloping angle 33. Thus, the reflected light off the second sloping surface 33 travels more outward. Light emitted from the rear half of the cold cathode tube 15 to each side of the arch surface 26B is reflected by the sloping surface 32 or 33 at a favorable angle toward the optical member 16.

According to the present embodiment described above, each sloping surface 29B is bent at a point and has different angles of slopes. Thus, a variety of reflected light angles could be produced by the sloping surfaces 29B.

Other Embodiment

The present technology is not limited to the embodiments explained in the above description made with reference to the drawings. The following embodiments may be included in the technical scope of the present technology, for example.

(1) As a modification of the above embodiment 1, the location of the focus of the parabolic section (parabolic surface) may be set at a different point off the center of the cold cathode tube to the left or right on the same horizontal line.

(2) In the above embodiment 1, the width of the arch section (arch surface) is substantially the same as the outside diameter of the cold cathode tube. However, it can be larger than the outside diameter of the cold cathode tube, and the present invention includes the one having such a structure.

(3) In the above embodiments 2 and 3, the width of the arch section (arch surface) is larger than the outside diameter of the cold cathode tube. However, it can be substantially the same as the outside diameter of the cold cathode tube, and the present invention includes the one having such a structure.

(4) In the above embodiment 1, the parabolic section (parabolic surface) is formed on each side of the arch section (arch surface). However, other types of curved surface, such as one having a cross-section of an arc of oval, may be formed, and the present invention includes the one having such a structure.

(5) The angle of the sloping section in the above embodiment 2 may be changed as long as an angle defined with the sloping surface and the normal line of the arch surface at its end is larger than 90 degrees.

(6) In the above embodiment 3, the sloping surface has two different angles of slopes. However, it can have three or more angles of slopes by increasing bending points, and the present invention includes the one having such a structure.

(7) In the above embodiments, the front ends of the concave portion are arranged at the same level as the center of the cold cathode tube. Hover, they may be arranged higher or lower than the center of the cold cathode tube, and the present invention includes the one having such a structure.

(8) In the above embodiments, the concave portion is formed symmetrically. However, it can be formed asymmetrically, and the present invention includes the one having such a structure.

(9) In the above embodiments, the reflecting sheet is used as an example of reflecting member. However, it is not limited to a sheet-shape and an arch surface may be formed on surface of a reflecting member in a block-like structure, for example. The present invention includes the one having such a structure.

(10) In the above embodiments, the cold cathode tubes are used for tubular light sources. However, hot cathode tubes, fluorescent tubes or other types of tubular light sources can be used for the present invention.

(11) In the above embodiments, the liquid crystal display device using a liquid crystal panel as a display panel is used. However, the present embodiments can be applied to a display device using other types of display panels.

(12) In the above embodiments, the television receiver having a tuner is used. However, the present embodiments can be applied to a display device without a tuner.

The invention claimed is:

1. A lighting device for a display device, comprising:

an optical member capable of light transmission and formed in a sheet-shape;

a tubular light source having a substantially circular cross-section and arranged behind said optical member; and a reflecting member arranged behind said tubular light source for reflecting light emitted from said tubular light source toward said optical member, wherein:

said reflecting member includes a concave portion that surrounds said tubular light source from a rear, said concave portion includes an arch section in an area behind said tubular light source and parabolic sections, said arch section facing a rear of said tubular light source and having a curve concentric with said tubular light source, said parabolic sections being continued from respective ends of said arch section to respective edges of the concave portion.

2. The lighting device for a display device, as in claim 1, wherein:

said concave portion includes a parabolic curved surface formed in an area adjacent to each side of said arch surface such that a focus thereof is located on a line that is perpendicular to a surface of said optical member and crosses a center of said tubular light source.

3. The lighting device for a display device, as in claim 2, wherein said focus is identical to a center of said tubular light source.

4. The lighting device for a display device, as in claim 1, wherein said concave portion includes a sloping surface in an area adjacent to each side of said arch surface, the sloping surface slanted so as to form an acute angle with a surface of said optical member and such that an angle measured between a normal line to said arch section at an end is 90 degrees or larger.

5. The lighting device for a display device, as in claim 4, wherein said sloping surface bends at a point and a slope angle thereof changes thereat.

6. The lighting device for a display device, as in claim 1, wherein said concave portion is formed such that front ends thereof are arranged at a same level as a center of said tubular light source.

7. The lighting device for a display device, as in claim 1, wherein said concave portion is formed symmetrically around a symmetrical axis that lies in a direction perpendicular to a surface of said optical member and crosses a center of said tubular light source.

8. The lighting device for a display device, as in claim 1, wherein said tubular light source is a cold cathode tube.

9. A display device comprising:

the lighting device for a display device, as in claim 1; and a display panel for providing display by use of light from said lighting device for a display device.

10. The display device as in claim 9, wherein said display panel is a liquid crystal panel that uses liquid crystal enclosed between a pair of substrates.

11. The display device as in claim 9, wherein the display device comprises a television receiver.

* * * * *